(12) United States Patent
Kleinerman

(10) Patent No.: US 7,586,106 B2
(45) Date of Patent: Sep. 8, 2009

(54) OPTICAL DETECTORS FOR INFRARED, SUB-MILLIMETER AND HIGH ENERGY RADIATION

(76) Inventor: Marcos Y. Kleinerman, 215 Sunset Ave., Amherst, MA (US) 01002

( * ) Notice: Subject to any disclaimer, the term of this patent is extended or adjusted under 35 U.S.C. 154(b) by 721 days.

(21) Appl. No.: 11/371,792

(22) Filed: Mar. 9, 2006

(65) Prior Publication Data

US 2006/0214113 A1  Sep. 28, 2006

Related U.S. Application Data

(63) Continuation-in-part of application No. 10/834,332, filed on Apr. 28, 2004.

(51) Int. Cl.
*G01T 1/10* (2006.01)
(52) U.S. Cl. .................................... 250/458.1
(58) Field of Classification Search ............... 250/458.1
See application file for complete search history.

(56) References Cited

U.S. PATENT DOCUMENTS

| | | | | |
|---|---|---|---|---|
| 2,642,538 A * | 6/1953 | Urbach | ................... | 250/316.1 |
| 3,796,884 A * | 3/1974 | Tricoire | ........................ | 430/20 |
| 4,061,578 A * | 12/1977 | Kleinerman | ................. | 250/330 |
| 4,819,658 A * | 4/1989 | Kolodner | ..................... | 600/549 |
| 5,304,809 A * | 4/1994 | Wickersheim | ........... | 250/458.1 |
| 6,648,506 B2 * | 11/2003 | McGrath et al. | ............ | 374/161 |

OTHER PUBLICATIONS

P. D. Mauskopf, J. J. Bock, H. Del Castillo, W. L. Holzapfel, and A. E. Lange, "Composite infrared bolometers with Si3N4 micromesh absorbers," Feb. 1, 1997, Applied Optics, vol. 36, No. 4, pp. 765-771. [correction of listing in Paper No. 20061011].*
P. D. Mauskopf, J. J. Bock, H. Del Castillo, W. L. Holzapfel, and A. E. Lange, "Compoiste infrared bolometers with Si3N4 micromesh absorbers." Feb. 1, 1997, Applied Optics, vol. 36, No. 4, pp. 765-771.*

* cited by examiner

*Primary Examiner*—Constantine Hannaher

(57) ABSTRACT

Optical methods and devices for the thermal detection and imaging of infrared, sub-millimeter, millimeter and high energy radiation, wherein the thermal mass of the detector is minimized by the use of microscopic photoluminescent temperature probes having a weight mass which can be of the order of $10^{-11}$ grams or smaller. Used for detection of high energy radiation, including quantum calorimetry, said temperature probes allow non-contact measurements free of electrical sources of noise like Johnson noise or Joule heating.

34 Claims, 5 Drawing Sheets

THERMALLY ACTIVATED FLUORESCENCE INTENSITY $I_f$ VS. INVERSE ABSOLUTE TEMPERATURE OF DMSO SOLUTIONS OF RHODAMINE 6G AND TWO OTHER DYES

OPTICAL DETECTORS FOR INFRARED, SUB-MILLIMETER AND HIGH ENERGY RADIATION

CROSS-REFERENCE TO RELATED APPLICATIONS

This application is a Continuation in Part of application Ser. No. 10/834,332 filed Apr. 28, 2004.

FIELD OF THE INVENTION

The present invention relates to methods and devices for sensing and imaging infrared, sub-millimeter and high energy radiation by means of optical temperature sensors of microscopic dimensions and very small thermal mass attached to absorbers of said radiation.

BACKGROUND OF THE INVENTION

Sensitive discrete and imaging detectors for X-ray and medium to long wavelength infrared or sub-millimeter radiation have been in great demand, especially for astronomy studies. The most sensitive devices are calorimetric, based on the measurement, with a bolometer, of a temperature rise caused by the absorption of said radiation, and require the minimization of the thermal mass of the detector in order to maximize the temperature rise. For terrestrial applications there is a need for thermal infrared detectors simpler and less expensive than the ones so far available. Thermal detection of X-ray photons with energies of the order of 1 KeV or higher has progressed to the point that one can measure the temperature rise generated by the absorption of a single X-ray photon, and the measuring devices are known as "quantum calorimeters". Thermal detection of medium or long wavelength infrared or sub-millimeter radiation is based on the same principles, but the energy of an infrared photon is several orders of magnitude lower than that of an X-ray photon, so a thermal infrared detector is not, strictly speaking, a quantum detector, and typically requires the absorption of a relatively large number of infrared or sub-millimeter photons. A thermal detector of infrared or sub-millimeter radiation comprises two elements: (a) an absorber of the radiation, usually a relatively thin (from less than one to a few micrometers) dielectric film coated with a thinner metal film, and (b) an associated temperature probe. The temperature rise measured by the probe is inversely proportional to the thermal mass of the detector. For a given weight mass, the thermal mass can be minimized by operating at liquid helium temperatures, where the heat capacity of the detector is approximately proportional to $T^3$, where T is the absolute temperature in kelvins. The most sensitive detectors are, therefore, those that work at temperatures lower than 1K. On the other hand, many applications of infrared detection and/or imaging involve infrared intensities high enough that, although they still require absorbers of low thermal mass, they don't require cryogenic cooling of the detector.

Some detectors for thermal infrared radiation of wavelengths between about 8 and 14 micrometers, and suitable for infrared imaging, have used as the infrared absorber an approximately 2 nanometer thick permalloy (a nickel-iron alloy) film deposited on a thin (about 250 nanometers) silicon nitride ($Si_3N_4$) film (see for example U.S. Pat. No. Re. 36,706, a reissue of the 1994 U.S. Pat. No. 5,286,976). Thus, for a typical pixel area of about $7 \times 10^{-6}$ cm$^2$ the absorber mass per pixel (including the $Si_3N_4$ film) was not much greater than $10^{-9}$ grams. As known to workers with at least average skill in the art, such values are not substantially greater than minimally needed for the capture of a desired fraction of the intensity of said infrared radiation incident on the detector. Thus, the mass of the photoluminescent temperature probe of this invention, for said thermal infrared detectors and imagers, is no greater than $10^{-10}$ grams per pixel, and may be about an order of magnitude smaller.

An important recent advance in detectors for long wavelength infrared and/or sub-millimeter radiation was the substantial reduction of the thermal mass of the absorber through the use of an essentially planar metalized micromesh geometry reminiscent of a spider-web, as described by Mauskopf et al. in the journal *Applied Optics* 36, pages 765-771 (1997). This reduces the mass of the absorber to a fraction of the mass of a continuous absorbing film (this fraction has been called "the fill factor", and this term shall be used in this disclosure). But there was no comparable advance in the reduction of the thermal mass of the temperature probe. In fact, the micromesh absorber now leaves the temperature probe as the largest component of the detector thermal mass in the art prior to this invention. And if the probe is electrical, as are the temperature probes in existing radiation detectors, it is also the main source of noise in the detector system, due to Johnson noise and/or Joule heating.

OBJECTS OF THE INVENTION

It is the main object of the present invention to reduce the thermal mass of discrete and imaging thermal detectors of infrared, sub-millimeter and high energy radiation, based on the use of new optical temperature probes of microscopic dimensions.

It is another object of the invention to provide simpler and less costly thermal infrared cameras for medical, industrial and security applications.

Other objects of the present invention will in part be apparent from the following discussion and will in part appear hereinafter.

Definitions

Within the context of this application, I am using the following definitions:

Light: optical radiation, whether or not visible to the human eye.

cm$^{-1}$: energy units expressed as the inverse of the corresponding wavelength $\lambda$ given in centimeters (cm).

Excitation light: illuminating light which can generate luminescence in a luminescent material.

Luminescence: Light emitted by a material upon absorption of light or other radiation of sufficient quantum energy. The term includes both fluorescence and phosphorescence.

Luminescence quantum efficiency $\phi$ (also referred to as luminescence efficiency): the ratio of the number of luminescence photons emitted by a material to the number of photons of the excitation light it absorbed.

Luminescence centers: the molecules, atoms or ions in a luminescent material from which the luminescence light is emitted.

Occupancy number of an energy level: the fraction of the total number of molecules of a probe material occupying said energy level.

Short wavelength infrared radiation: radiation of wavelengths from about 0.7 to about 2.0 micrometers (μm).

Medium wavelength infrared radiation: radiation of wavelengths from about 2.0 to about 20 μm.

Long wavelength infrared radiation: radiation of wavelengths from about 20 to about 200 μm.

Sub-millimeter radiation: radiation of wavelengths from about 200 to about 1000 μm.

Micromesh absorber: an absorber of radiation from infrared to millimeter wavelengths comprised of a metalized web of fibers of a dielectric material.

Photoluminescence: Luminescence generated by the absorption of light.

Pixel: a minute area of illumination, one of many from which an image is composed, either in a sensitive surface on which an image to be processed is focused, or in the image shown in a display screen.

Thermal mass: the product $m.C_v$, where m is the mass of the detector in grams and $C_v$ is its heat capacity per gram at the operating temperature.

$\lambda_v$: wavelength of luminescence excitation light the absorption of which is substantially temperature-dependent.

BRIEF SUMMARY OF THE INVENTION

An optical technique for sensing long wavelength infrared radiation based on thermally activated light absorption within a pre-selected wavelength region was disclosed in section 16, columns 49-50 of U.S. Pat. No. 5,499,313 to Kleinerman (see also references cited therein to earlier patents), and in section 3.2, columns 13-14 of U.S. Pat. No. 5,560,712, the teachings of which are incorporated herein by reference. The teachings of that patent allow the measurement of the temperature rise of a solid infrared absorbing film by an attached thin film of a photoluminescent material covering one side of the infrared-absorbing film. The invention disclosed herein uses the same temperature sensing principles, but it is a substantial improvement on the technology of said patent in that it provides an unprecedented reduction of the thermal mass of the infrared or sub-millimeter detector through the use of optical temperature probes of microscopic dimensions and a thermal mass much smaller than that of the micromesh absorbers recently introduced by Mauskopf et al. In one preferred embodiment the temperature probe is comprised of a strongly light-absorbing photoluminescent material coated on a small fraction only of the area of the absorber, and of dimensions that need not be much greater than the wavelength of luminescence excitation light, said wavelength being chosen such that the intensity of the generated photoluminescence, at a given intensity of said excitation light, is a unique indicator of the temperature of the temperature probe and, hence, of the intensity of the absorbed radiation being measured. The system's advantages operate for both infrared, sub-millimeter and high energy radiation, as follows:

Needing no wires or other conductors, they are not subject to Johnson noise or Joule heating effects;

They require only weak light intensities for operation and, since most of the energy of the absorbed light is re-emitted as fluorescence, its heating effects and other potential contributions to noise are small.

Their thermal mass can be orders of magnitude smaller than that of electrical temperature probes;

Two-dimensional arrays of optical quantum calorimeters and infrared detectors should be simpler to construct than those using electrical thermometers, because all the elements of the array ('pixels') could be interrogated by a single light source, and their signals could be imaged into a single, inexpensive, low noise photo-electronic imaging device;

Used as imaging detectors in infrared astronomy, the infrared image, converted at the infrared sensor film into a visible or near infrared image, could be processed, stored and integrated by a simple TV-type visible imaging device;

They do not require low noise cryogenic electronic amplifiers, as the signals are optical and of wavelengths within the range of operation of sensitive photomultipliers and imaging devices.

They should, therefore, provide significantly improved sensitivity compared to currently used quantum calorimeters and infrared imaging bolometers, in addition to requiring much simpler instrumentation. The following are a detailed discussion of the physical processes common to both of the proposed devices and a discussion of how these devices could be constructed.

1. PHYSICAL BASIS OF RELATED PRIOR ART 1.1 Thermally-activated Optical Absorption Processes in Photoluminescent Materials.

The technology to be described uses the fact that all solid and liquid materials which absorb light of visible or near infrared wavelengths have a temperature-dependent optical absorption at the long wavelength tail of an electronic absorption band. If the materials are photoluminescent and absorb only a small fraction of the intensity of the incident light, the intensity of the photoluminescence is the most convenient indicator of the magnitude of the optical absorption. This can be understood with the help of FIG. 1. The analysis that follows, taken from Kleinerman's U.S. Pat. 5,499,313, is deliberately oversimplified to emphasize the aspects most relevant to the invention. The quantitative relationships may not be followed rigorously in all practical systems. I do not wish to be bound by theory, and the account that follows must be taken as a model for understanding how the absorption of light of some wavelengths by a material, and the luminescence intensity generated by the absorbed light, can increase substantially and predictably with increasing temperature.

Figure 1:
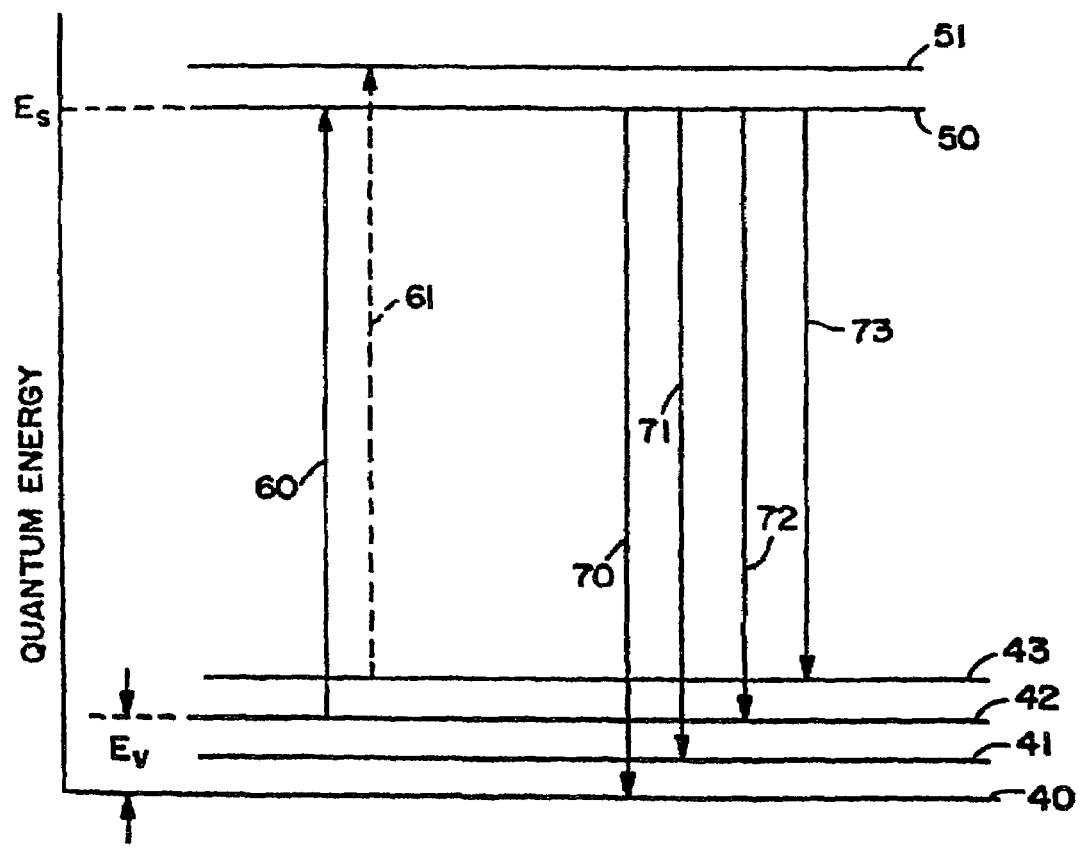
FIG. 1 is a simplified molecular energy diagram illustrating a temperature-dependent optical absorption process and luminescence conversion of the absorbed light in most photoluminescent materials.

FIG. 1 shows a diagram of electronic energy levels and transitions which at least qualitatively describes, at the molecular level, most luminescent materials. The luminescent material includes, at the atomic or molecular level, luminescence centers having a ground electronic level comprising vibrational sublevels 40, 41, 42, 43 and other sublevels which, for the sake of simplicity, are not shown. The lowest excited electronic energy level comprises sublevels 50, 51, and any other sublevels not shown. The vertical arrowed line 60 represents an optical electronic transition produced by the absorbed visible or near infrared excitation light from sub-level 42 to excited level 50, which have fixed energy levels $E_v$ and $E_s$, respectively, relative to the ground level 40 (The subscript "v" originated from the fact that in most photoluminescent materials the thermally excited sub-level is "vibronic"). The length of line 60 corresponds to the photon energy of the optical transition and, hence, to the specific wavelength $\lambda_v$ of the excitation light. This wavelength, usually in the long wavelength 'tail' of the electronic absorption band, obeys the relation $$\lambda_v = hc/(E_s - E_v) \text{ centimeters (cm)} \tag{1}$$

where h is Planck's constant and c is the velocity of light in free space. The wavelength $\lambda_v$ can excite only molecules occupying vibrational level 2 and, to a smaller extent, molecules occupying slightly higher levels, the excitation of which is represented by the dotted vertical line 61. Luminescence emission of wavelengths $\lambda_l$ occurs from level 50 to the different sub-levels of the ground electronic level, said emission represented by lines 70, 71, 72 and 73. As shown in FIG. 1, a considerable spectral portion of the emission occurs at photon energies higher (and wavelengths $\lambda_{la}$ shorter) than that of the excitation light, and is commonly referred to as anti-Stokes emission.

In practice the photoluminescent material used in a temperature probe is usually a solid solution, glassy or crystalline, which constitutes the probe. The concentration of the photoluminescent material and the dimension of the probe along the direction of the interrogating light are chosen so that the probe absorbs only a temperature-dependent fraction $\alpha_T$ of the intensity of the nearly monochromatic excitation light within the temperature range of operation, and transmits the rest. At relatively low optical densities the fraction $\alpha_T$ of the intensity P of the interrogating light absorbed by the molecules occupying the sublevel 42 obeys the relation $$\alpha_T = K N_{42}/N_{40} \tag{2}$$

where $N_{42}$ is the number of molecules of the photoluminescent material occupying vibrational level 42;

$N_{40}$ is the number of the molecules of the photoluminescent material occupying level 42; and K is a constant specific to the probe Now $$N_2/N_{40} = \exp(-E_v/kT) \tag{3}$$

At optical densities no greater than about 0.02 $\alpha$ is given approximately by $$\alpha_T = K \cdot \exp(-E_v/kT) \tag{4}$$

where k is the Boltzmann factor and T the absolute temperature in kelvins. At optical densities greater than 0.02 the relationship between $\alpha$ and the Boltzmann factor $\exp(-E_v/kT)$ becomes less linear, but equations (2) and (3) still hold, and the method can be used at high, low or intermediate optical densities.

The luminescence intensity $I_T$ generated by the interrogating light absorbed by the probe obeys the relation $$I_T = P_0 \cdot \phi \, K \cdot \exp(-E_v/kT) \text{ photons.sec}^{-1} \tag{5}$$

where $P_0$ is the intensity of the interrogating light, and $\phi$ is the luminescence quantum efficiency of the probe.

Probes made from materials having high $\phi$ values can produce large signal-to-noise ratios even with optical densities lower than 0.01, provided that the optical system has at least a moderately high collection efficiency for the probe luminescence. Such efficiency is easily obtainable with state-of-the-art systems.

The temperature coefficient of the luminescence intensity follows approximately the relation $$(1/I_{T0})(dI_T/dT) = E_v/kT^2 \tag{6}$$

where $I_{T0}$ is the luminescence intensity at a chosen reference temperature. For example, a material with an energy $E_v$ of 1200 cm$^{-1}$ has a coefficient of about two percent per kelvin at an ambient temperature of 295 K. Equation (6) assumes that the luminescence quantum efficiency $\phi$ is substantially independent of temperature over the temperature range of application of the method.

The model illustrated in FIG. 1 shows that this method for measuring temperature requires only a temperature-dependent change in the optical absorption coefficient of the luminescent probe material at wavelengths corresponding to photon energies lower than the energy $E_s$ of the excited emissive level. This property is shared by virtually all luminescent materials. And equations (4) to (6) lead to the following conclusions:

a) The method does not require any temperature-dependent changes in the luminescence quantum efficiency, spectral distribution or decay time T of the probe luminescence.

b) For any given value of $(E_v/kT)$ the temperature coefficient of the luminescence intensity increases inversely proportionally to T.

c) Since $\alpha_T$ is directly proportional to $[\exp(-E_v/kT)]$ it follows that, for similar values of $\alpha_T$, the working values of $E_v$ must decrease for lower temperature ranges.

d) Operation at very low temperatures requires very stable monochromatic excitation wavelengths. At liquid helium temperatures, for example, the excitation energy should not vary by more than about 0.1 cm$^{-1}$.

Experimental tests of equations (4) to (6) have been carried out with liquid solutions of three different dyes dissolved in dimethyl sulfoxide (DMSO). Dye I and dye II are represented by the chemical structures

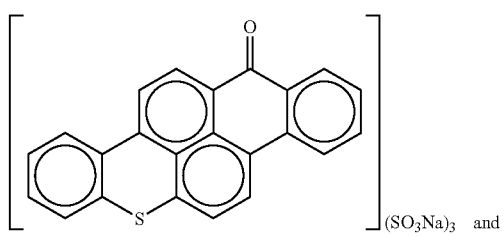

I and

-continued

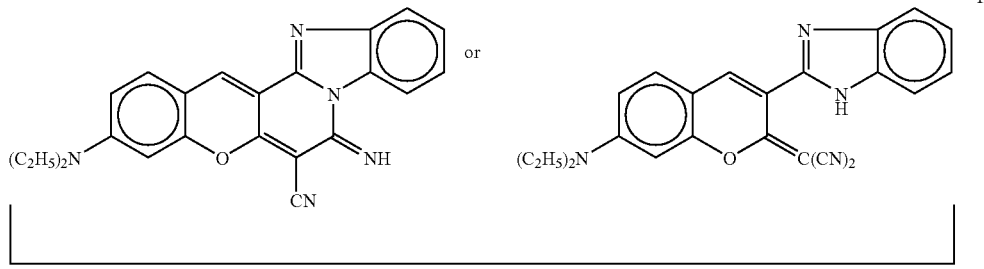

Figure 2:
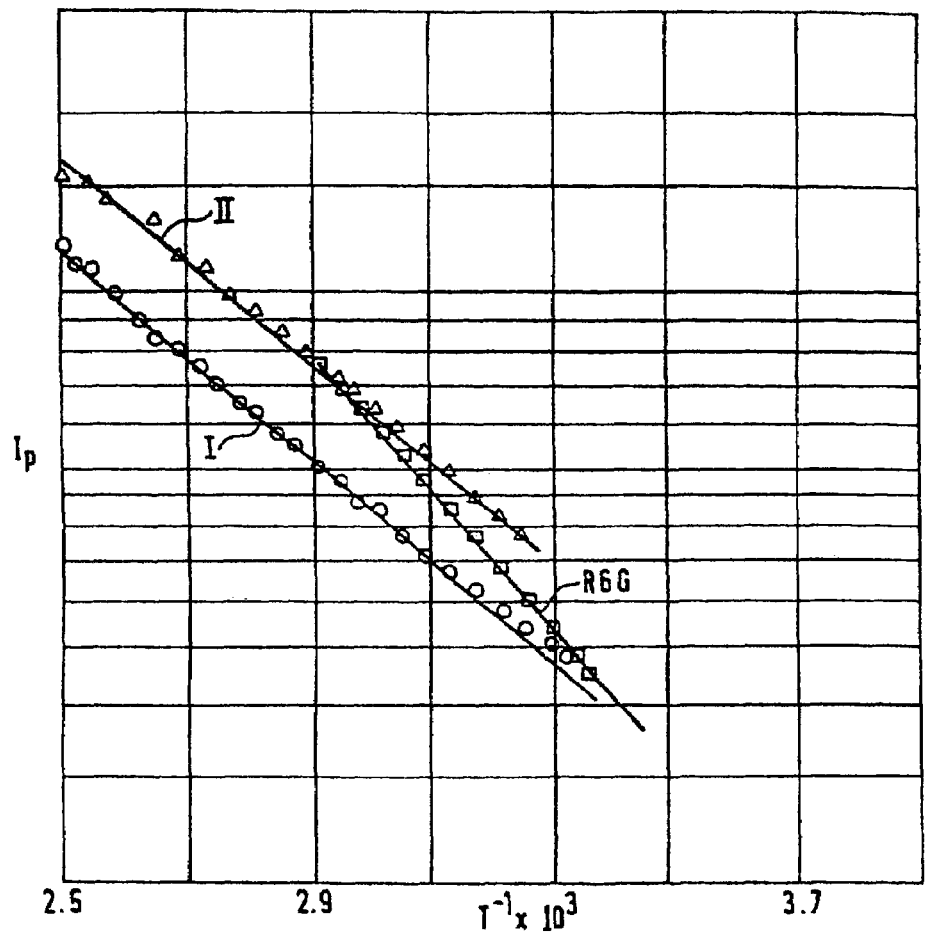
FIG. 2 shows the temperature dependence of the normalized thermally activated fluorescence intensities of three organic dyes as a function of the inverse absolute temperature.

Dye I is the sulfonated derivative of Hostasol Red GG (American Hoechst Corp.). Dye II has been described in U.S. Pat. No. 4,005,111 by Mach et. al. The third dye is the well known Rhodamine 6G (R6G). Dye concentrations were about $10^{-4}$ Molar, with a path length of 1 cm. The dye solutions were illuminated by a 632.8 nanometers (nm) light beam from a helium-neon laser. The fluorescence intensity was monitored at a wavelength of 610 nm, shorter than the laser beam wavelength. The experimentally measured fluorescence intensities $I_f$ were measured as a function of the absolute temperature T. Plots of $I_f$ v. $T^{-1}$ are shown in FIG. 2 for the three dyes. The behavior predicted by equations (3) and (5) was confirmed. The slopes of the lines drawn through the experimental points give $E_v$ values of 1380, 1355 and 1890 $cm^{-1}$ for dyes I, II and R6G, respectively. When these values are added to the excitation photon energy of 15803 $cm^{-1}$, one obtains $E_s$ values of $1.72 \times 10^4$ $cm^{-1}$ for dyes I and II, and $1.77 \times 10^4$ $cm^{-1}$ for R6G. These values are in good agreement with the $E_s$ values determined from the fluorescence spectra of these dyes.

The superiority of this method of temperature measurement compared to that based on light transmission measurements becomes evident from the fact that over the temperature interval from about 300 K (27° C.) to about 400 K (127° C.) the light transmission of the dye solution varies by less than two percent, while the intensity ratio of fluorescence light to transmitted light varies by about an order of magnitude.

Figure 3:
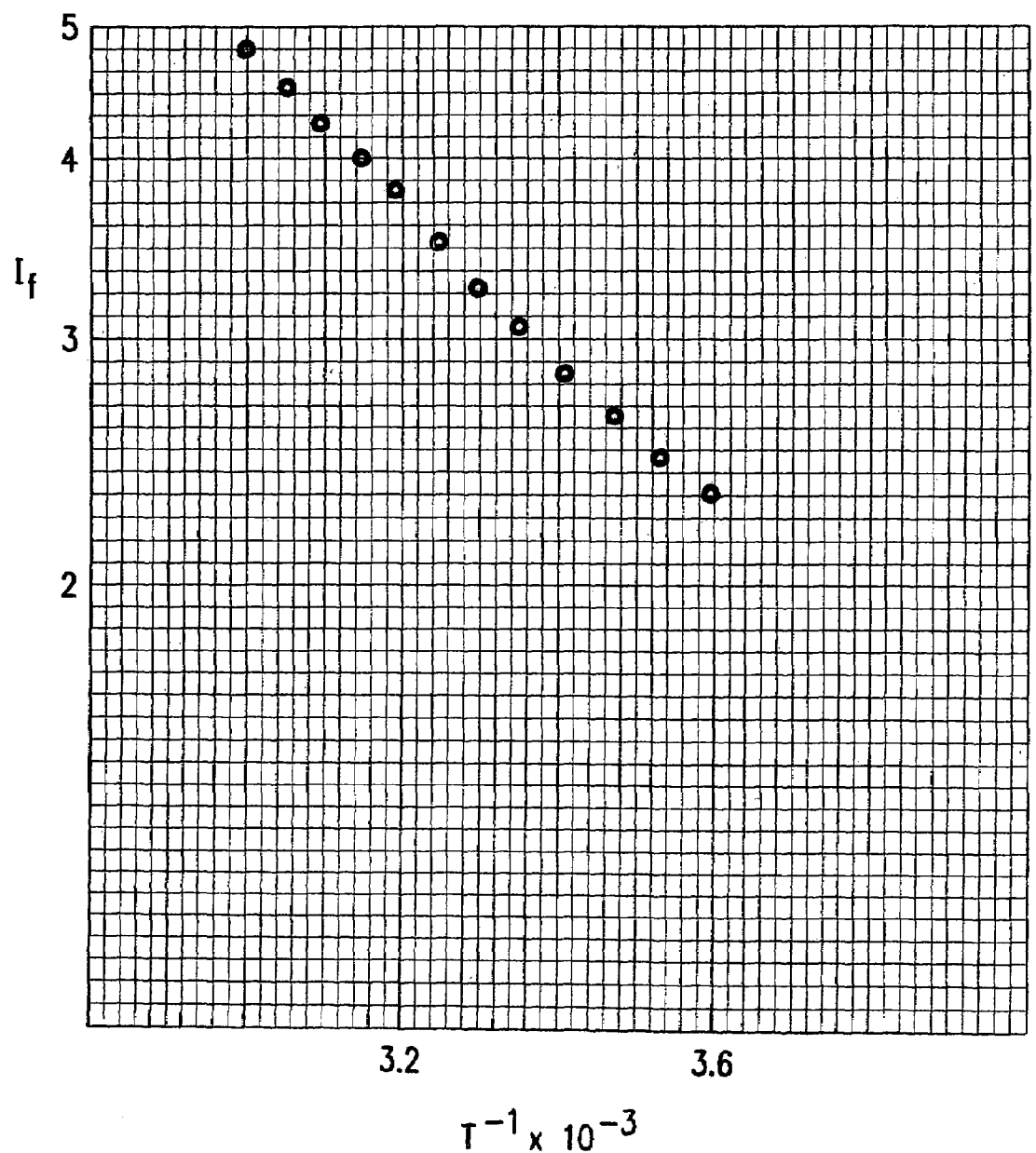
FIG. 3 shows the temperature dependence of the normalized thermally activated fluorescence intensity of a polymer solution of an organic dye as a function of the inverse absolute temperature.

Dye II was incorporated into a poly-α-methyl styrene plastic at a concentration of the order of 0.01 Molar. FIG. 3 shows the temperature dependence of its normalized fluorescence intensity $I_f$ over a temperature range of medical interest.

1.2 Special Case at Liquid Helium Temperatures.

At liquid helium temperatures, below 4.2K, and especially below 1.0K, there is proportionally a very small number of molecules or ions of the photoluminescent material which are thermally excited above the ground level. As a consequence, the absorption coefficient for exciting the ground state molecules to the first electronic excited level, and hence the intensity of the generated photoluminescence light, is much greater in very thin films than at higher temperatures. It is also strongly temperature-dependent. This fact can be used to measure temperature in the cryogenic region at or below 1.0K.

2. DETAILED DESCRIPTION OF THE INVENTION

2.1 Detectors for Infrared Radiation

In broad terms, there are two kinds of electrical long wavelength infrared detectors namely a) quantum detectors and b) bolometers.

In a quantum detector the absorption of infrared photons within an electronic absorption band generates charge carriers with a quantum efficiency q.

A bolometer is essentially a temperature-dependent resistor of relatively low thermal mass m.$C_v$, where m is the mass of the detector in grams and $C_v$ is its heat capacity per gram at the operating temperature. The lower the thermal mass, the greater the temperature rise and, hence, the signal generated by the absorption of a unit of energy of the absorbed infrared radiation. Bolometers are sensitive over a much greater range of infrared wavelengths than quantum detectors. Cryogenically-cooled bolometers are especially sensitive. The most sensitive bolometers operate in the lower cryogenic regions, usually at liquid helium temperatures (4.2 K and below). The main advantage of operation at such low temperatures is that the heat capacity $C_v$ of the detector material (and that of virtually all solid materials) is orders of magnitude smaller than the $C_v$ at temperatures higher than about 20K.

For the sensing and processing of a medium or long wavelength or submillimeter infrared image, focal plane arrays have been widely used in recent years. These are electrically-interconnected line or two-dimensional arrays of individual small detectors. Their main disadvantage is that, for applications requiring high sensitivity, one has to keep the whole ensemble, including pre-amplification electronics, at cryogenic temperatures. The relative complexity of such an arrangement and the complexity of fabricating an array where all the elements (pixels) have the same response have kept the equipment costs relatively high.

Now, it is well known that the situation is very different for the processing of visible or near infrared images. The existing imaging devices (for instance CCD arrays) have high sensitivity and low noise even at ordinary temperatures, in addition to being relatively inexpensive and of small size. It follows, then, that if one had some means for converting a thermal image into a visible or near infrared image with high efficiency and by an instrumentally simple method, this would represent an important technological and commercial advance.

This invention provides such a means. It is an improvement upon the temperature and infrared sensing technology disclosed in said U.S. Pat. No 5,499,313. The only element of the sensing device that has to be cooled is a thin infrared-absorbing film having, in one preferred embodiment, an attached photoluminescent dot with an area of a few $\mu m^2$ and a thickness of the order of 1 μm. The technology does not require any temperature-dependent change in the luminescence quantum efficiency, decay time or spectral distribution of the photoluminescent material.

Discrete and Imaging Infrared Detector of Reduced Thermal Mass.

A detector which absorbs energy undergoes a temperature increase ΔT. Let us start from the temperature-sensing technology described in Section 1. above. Referring to FIG. 1 and equation (6), it can be noticed that for any value of $(E_v/kT)$ the temperature coefficient of the luminescence intensity $I_f$ increases as the absolute temperature decreases. The relative increase $\Delta I_f$ in the luminescence intensity follows the relation $$\Delta I_f / I_{f0} = (E_v/kT)(\Delta T/T)$$

or $$\Delta I_f / I_{f0} = (E_v/kT)(H/mC_vT) \quad (7)$$

where H is the heat generated by the absorbed radiation, $C_v$ is the heat capacity per gram at the operating temperature and m is the mass of the detector in grams.

The thermal mass of the detector is the product $mC_v$ as defined above and it has two components: a) the thermal mass of the radiation absorber, and b) the thermal mass of the temperature probe. From equation (7) above it follows that the signal $\Delta I_f$ is inversely proportional to the mass of the detector. So, reducing the thermal mass of the detector is of the utmost importance. In recent years there was a breakthrough in the reduction of the thermal mass of the radiation absorber, by the use of the "spider-web" absorber mentioned above. This consists of a substantially planar micromesh of etched silicon nitride ($Si_3N_4$) fibers of width of the order of a micrometer (μm) and separated by a distance smaller than the wavelength of the radiation to be detected, and preferably greater than the width of the fibers. A metal coating less than 0.1 μm thick is usually applied to the micromesh to enhance absorption of infrared radiation. Under these conditions a substantial fraction of the intensity of the incident infrared radiation is absorbed, but radiation of shorter wavelength, mainly visible light, can pass through the micromesh.

The spider-web absorber was developed mainly for very long wavelength infrared (>100 μm) and sub-millimeter and millimeter radiation, the detectors for which must have necessarily a larger diameter—and, hence, thermal mass—than those needed for the more commonly detected middle infrared (of the order of 10 μm). As the weight mass of the absorber is at least an order of magnitude smaller than that of a solid absorber, so is the thermal mass. For the middle infrared region the inter-fiber distance must be shorter, but the thermal mass of the absorber can still be made much smaller than that of a solid film absorber.

But the spider-web technique does not appreciably affect the thermal mass of the temperature probe. This is usually a semiconductor thermistor, but can also be a transition edge superconductor operated at the superconducting transition temperature. In either case, in detectors for infrared radiation of wavelengths shorter than 50 μm the thermal mass of the temperature probe is usually greater than that of the spider-web absorber.

The improvement provided by this invention takes advantage of the fact that the photoluminescent temperature probe can be interrogated with light of wavelength shorter than 1 μm, and such light can be focused on a probe of similar dimension. Therefore, the temperature probe can be a microscopic dot, with an area much smaller than that of the infrared absorber. And since the thickness of the dot need not be much greater than 1 or a few μm, its weight mass can be much smaller than one tenth of the mass of an optimized infrared absorber. In other words, the thermal mass of the detector at its operating temperature can be much smaller than 1.1 times the mass of the absorber alone.

Figure 4:
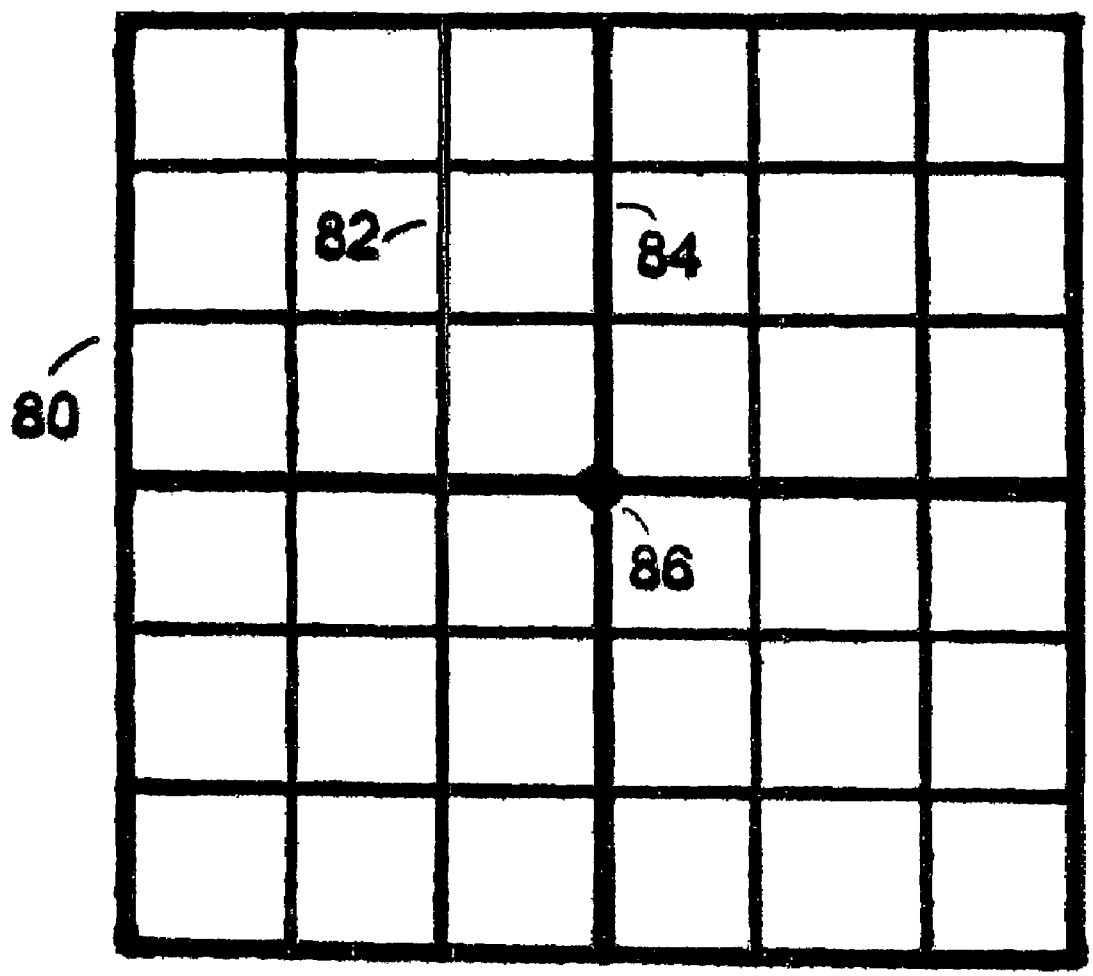
FIG. 4 is a schematic diagram of a micromesh infrared sensor film according to the invention.

A schematic diagram of the absorber/probe system is shown in FIG. 4. The micromesh film 80 is comprised of the set of relatively thin fibers 82, with a thickness and width not much greater than 1 μm, and the fibers 84, which are just wider enough to provide a support for the dot 86 of the photoluminescent temperature probe and for providing a more rapid heat conduction path to said probe than allowed by the thinner fibers 82. The fibers are disposed over a metallic film, for example gold, usually less than 100 nm thick.

In order to process an infrared image the area A of the absorbing film is made sufficiently large to comprise the desired number of 'pixels', each pixel including its own photoluminescent temperature-sensing dot.

The main characteristics of this invention are as follows:

a) The thin photoluminescent dot is excited by light of wavelength $\lambda_v$ to emit visible or near infrared luminescence light of wavelengths $\lambda_f$ within the spectral range of operation of sensitive TV cameras.

b) The infrared radiation to be detected and/or measured is focused on the infrared absorbing film, thus causing a temperature rise of the film corresponding to the intensity of the infrared radiation incident on the film;

c) The absorption of excitation light of wavelength $\lambda_v$ increases in a known manner with increasing temperature, causing the film to emit more intense luminescence light from the points which were heated by the infrared radiation incident on the film. The stronger the infrared radiation falling on any image point on the film, the stronger the luminescence light emitted from that point, so that the film generates a visible image corresponding to the infrared image incident on the film.

d) Light of any infrared wavelengths, from the near infrared to the far infrared (up to millimeter waves) cause heating when absorbed. Therefore, the invention can detect and process infrared images over a very wide infrared wavelength range.

e) A decrease in temperature decreases the background noise and increases the temperature coefficient of the signal. Thus, the technique is expected to be more sensitive at liquid nitrogen temperatures, and orders of magnitude more sensitive at liquid helium temperatures.

A Preferred Embodiment of a Discrete Infrared Detector

The discrete detector of this example is intended to measure infrared spectra within the wavelength range from about 2.5 μm to 25 μm in a Fourier Transform Infrared Spectrometer, and is designed for operation at temperatures lower than ambient, whether Peltier-cooled or, for higher sensitivity, at about 77K. Because said wavelength range includes relatively short wavelengths, a micromesh absorber would offer a smaller improvement than could be obtained at longer infrared wavelengths, so one may use a continuous thin infrared absorbing film with a diameter of about 25 to 30 μm and a thickness not much greater—and preferably smaller—than about 1 μm. The main reduction of the thermal mass of the detector is then realized by using, as the temperature probe, a microscopic photoluminescent temperature probe attached to the center of the absorbing film and having an area of the order of 1 μm², that is a weight mass not greater than about $10^{-11}$ grams. This can be a dot of a highly absorbing semiconductor like cadmium telluride (CdTe), which is strongly fluorescent at 77K and lower temperatures, or a strongly absorbing fluorescent dye, for example a phthalocyanine or naphthalocyanine or one of their chelates with zinc (Zn), magnesium (Mg) or aluminum (Al). Alternatively, the temperature probe can be in the form of a thin fiber attached to the plane of the absorber. In operation, the photoluminescent temperature probe is excited with CW light of wavelength $\lambda_v$, which generates a CW photoluminescence background. The infrared radiation to be detected is AC-modulated before it is focused on the infrared absobing film, thus increasing the film temperature and generating on the temperature probe an AC-modulated photoluminescence with an intensity determined by the temperature rise of the film. A fraction of the intensity of the AC-modulated photoluminescence is directed by optical means to a suitable light detector like a photodiode or a photomultiplier, and the luminescence intensity changes generated by the absorbed infrared radiation are measured therein.

A Preferred Embodiment of a Sensor of Long Wavelength Infrared and Sub-millimeter Radiation.

The detection of long wavelength infrared and sub-millimeter radiation has recently become a fast-growing area of astronomy. It was, in fact, work in this area that led to the invention of the spider-web micromesh absorber, as reported in the above cited article by Mauskopf et al. Not coincidentally, it is in the detection of radiation of said long wavelengths that a micromesh absorber is most advantageous. As the radiation wavelength increases one can increase the separation between the fibers of the micromesh, and hence decrease the fill factor to not more than a few percent of the value of a continuous film of the absorber. Under these conditions, the thermal mass of the detector is determined by the mass of the bolometer. And this is precisely this limitation that the present invention is design to overcome, as the thermal mass of the temperature probes of this invention can be orders of magnitude smaller than that of bolometers of the present art.

A preferred embodiment of a micromesh sensor film for long wavelength infrared and sub-millimeter radiation is illustrated in FIG. 4. The micromesh film 80 is comprised of the set of relatively thin fibers 82, with a thickness and width not much greater than 1 µm, and the fibers 84, which are just wider enough to provide a support for the dot 86 of the photoluminescent temperature probe and for providing a more rapid heat conduction path to said probe than allowed by the thinner fibers 82.

Alternate Embodiment Using an Infrared Absorbing Material Doped with a Photoluminescent Material.

The dielectric material of the micromesh infrared absorber may itself be doped with a visible or near infrared photoluminescent material. In fact, silicon nitride films of thickness of 1.2 µm have been doped with about $4.0 \times 10^{12}$ Si atoms.cm$^{-2}$ [Y. Q. Wang et al, Appl. Phys. Lett. 83, 3474 (2003)]. In such case the micromesh absorber is its own temperature probe, and can be interrogated with the technology described in section 1. above, with light of a suitable wavelength $\lambda_v$, injected along the length of one or more of its fibers.

An Embodiment Using a Photoluminescent Material Having Two Distinct Kinds of Luminescence Centers The main improvement provided by this invention, namely an unprecedented reduction of the thermal mass of the infrared or sub-millimeter detector through the use of optical temperature probes of microscopic dimensions, can also be realized through the use of photoluminescent temperature sensing materials which do not require a temperature-dependent light absorption coefficient $\alpha_T$. A suitable class comprises materials having two distinct kinds of luminescence centers A and B such that the relative intensities of the luminesce emitted by these centers is a unique function of temperature.

Materials having two distinct kinds of luminescence centers include, among others, energy donor-acceptor pairs, wherein at least a fraction of the energy of the excitation light absorbed by the A centers is transferred to the B centers, thus causing a reduction of the luminescence intensity from the A centers and an increase of the luminescence intensity from the B centers. Such an energy transfer process can be temperature-dependent according to the energy level model illustrated in FIG. 5, a simplified, representative energy level diagram of such materials. The diagram shows the excited energy levels of these materials—relative to the ground level G—most relevant to this discussion. The material is chosen so that the concentration of the B centers is much smaller than that of the A centers. Energy transfer cannot occur efficiently from an A center to a B center except via an intermediate level X having an energy higher than that of the excited level of the A centers by a value $\Delta E$ such that there is a temperature-dependent Boltzmann equilibrium between the occupancy numbers of the excited levels of the A centers and level X according to the relation $$[X] \propto [A] \exp(-\Delta E/kT) \qquad (8)$$

where the square brackets indicate occupancy number.

Absorption of light of appropriate wavelengths excites the A centers. Part of the excitation energy of these centers is emitted as visible light with a strong spectral component of wavelength $\lambda_1$. Within the temperature range of operation, another part is thermally excited to the X level of the microcrystalline material until it reaches the B centers. The excited B centers occupy a level substantially lower than the level of the excited A centers, and too low for re-excitation to the X level. The excitation energy of these B centers is then emitted as light with a main spectral component of wavelength $\lambda_2$ longer than $\lambda_1$.

Since the rate of energy migration from the A centers to the B is a thermally activated process, with an activation energy $\Delta E$, the luminescence intensity from the B centers follows a Boltzmann function dependence, just like thermal excitation of molecules from the ground level to a level with an energy $E_v$ above the ground level, discussed in section 1. above. Therefore, the temperature coefficient of the intensity of the luminescence $I_B$ from tthe B centers) follows the relation $$(1/I_{B0})(dI_{BT}/dT) = \Delta E/kT^2 \qquad (9)$$

where $I_{B0}$ is the intensity at the reference temperature $T_0$. This relation is essentially the same as equation (6). But these materials offer an extra advantage. For every increase of the intensity $I_{BT}$ there is a corresponding decrease of the intensity of the luminescence $I_{AT}$ from the A centers. Therefore, the temperature coefficient of the ratio $R_{BA}$ of the luminescence intensities from the B and the A centers is twice as large as the coefficient of the luminescence intensity of the B centers. This can be expressed as $$(1/R_0)(dR_{BA}/dT) = 2\Delta E/kT^2 \qquad (10)$$

where $R_0$ is the ratio at the initial temperature before the absorption of the infrared radiation.

Another advantageous feature of this embodiment is that the ratio $(I_{BT}/I_{AT})$ is independent of any variations or fluctuations of the intensity of the excitation light.

Yet another advantageous feature of this embodiment is that the subject photoluminescent materials can be excited with optical wavelengths $\lambda_v$ at which the light absorption is temperature-dependent, as discussed in section 1, in addition to measuring the ratio $R_{BA}$. This provides a further increase in temperature sensitivity.

Figure 5:
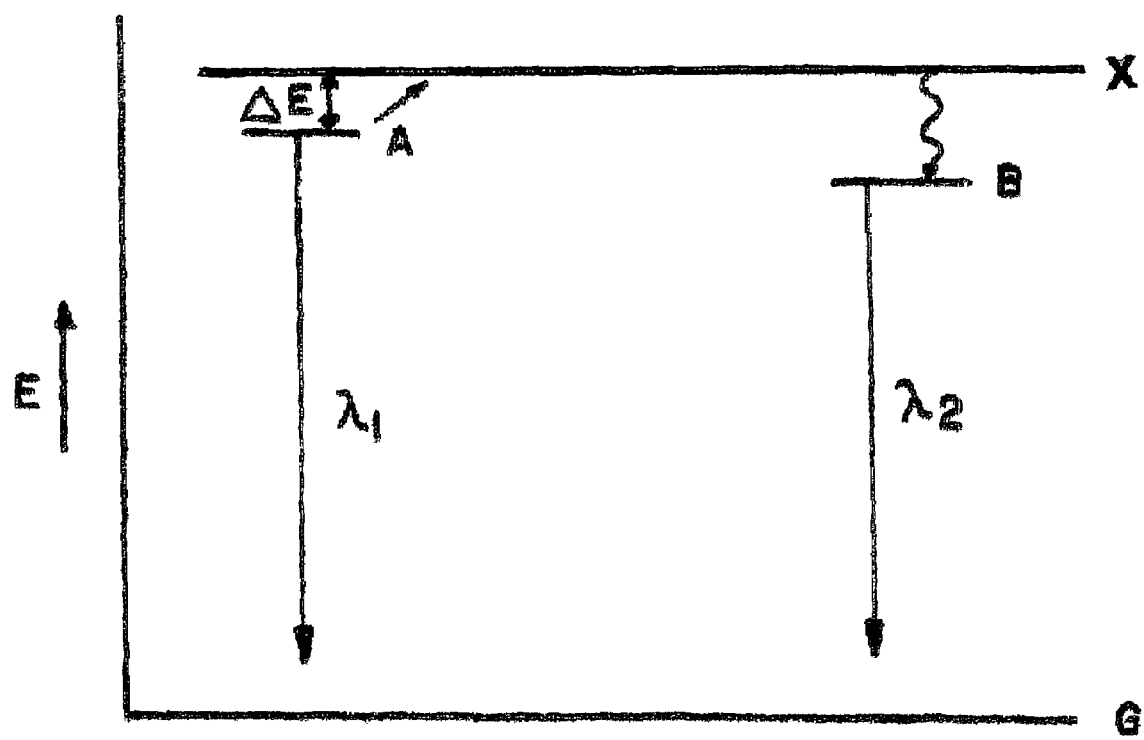
FIG. 5 shows the flow of excitation energy from luminescence centers A of a crystalline luminescent material to dopant luminescence centers B.

Materials which behave according to the model of FIG. 5 can be chosen from the groups of materials including luminescent semiconductors and crystalline chelates, wherein at least one the luminescent centers A or B is a rare earth ion. Among said crystalline chelates there are suitable chelates of $Tb^{3+}$ ions doped with relatively small concentrations of $Eu^{3+}$ ions. The $Tb^{3+}$ ions are the A centers and the $Eu^{3+}$ ions are the B centers. The use of such materials in an early system for thermal infrared imaging was described in U.S. Pat, No. 3,639,765 and 4,061,578.

2.2 Imaging Infrared Detectors

Portable Thermal Infrared Imagers for Industrial, Security and Medical Applications.

A micromesh infrared absorbing film having an area A suitable to comprise the required number N of pixels is used in a portable thermal infrared imager for industrial, security and medical applications. The main spectral range of interest is from about 8 to 14 μm. In this case a planar $Si_3N_4$ spider web absorber is suitable, with a fiber-to-fiber distance of about 6 μm and a fiber thickness not much greater than about 1 μm. The fill factor of the spider web absorber can then be about 0.30 or smaller. The detector is designed for operation at temperatures within the range generated by thermoelectric (Peltier) coolers, that is from about −100° C. to about −50° C. The micromesh film is nearly square (but could be nearly circular) with a side length of about 0.50 cm. A two-dimensional array of temperature sensing photoluminescent dots at a distance of about 25 μm from each other determines the number of approximately square 'pixels' and their dimensions. The photoluminescent material of the temperature sensing dots can be the so-called "quantum dots", namely semiconductor nanocrystals, based on CdTe or CdSe cores. These nanocrystals have a much higher fluorescence efficiency at temperatures in which the fluorescence of 'bulk' CdTe or CdSe is quenched, thus allowing uncooled or Peltier-cooled operation.

In operation, the infrared image is focused on the micromesh infrared absorbing film while the photoluminescent dots are excited with luminescence excitation light of wavelength $\lambda_v$. The infrared image causes a two-dimensional temperature distribution and, hence, a luminescence light on the film corresponding to the focused infrared image. The luminescence image is focused by a lens or mirror system on a photo-electronic imaging device and processed into a visual diplay of the infrared image.

In an alternate embodiment the photoluminescent material of the microscopic temperature probes is a $Tb^{3+}$ chelate doped with a relatively small concentration of $Eu^{3+}$ ions, as discussed in the preceding section. In this case one could use a photoelectronic imaging device for displaying the two-dimensional temperature distribution (corresponding to the infrared image) based on the intensity distribution of the luminescence of the $Eu^{3+}$ ions —which increase with increasing temperature—or the intensity distribution of the luminescence of the $Tb^{3+}$ ions—which decrease with increasing temperature—. Or, one could use an optical filter for separating the green luminescence of the $Tb^{3+}$ ions from the red luminescence of the $Eu^{3+}$ ions and direct the two luminescence distributions to separate TV cameras and process the infrared image from the ratio of these two luminescence lights at each pixel.

Instead of a two-dimensional array of temperature sensing photoluminescent dots one could use a micromesh absorber itself as a temperature probe, provided the fibers of the micromesh are made of an optically homogeneous material doped with a photoluminescent material.

In another preferred embodiment, the imaging infrared detector is a two-dimensional array of closely spaced square or circular individual detectors, each individual detector having its own photoluminescent temperature probe, the spacing between said individual detectors being substantially smaller than the diameter or the side length of the individual detectors.

Simultaneous Infrared and Visible Imaging

A 'spider-web" micromesh infrared absorber whose fibers have a spacing greater than their diameter and greater than about 1 μm is or can be made partly transparent to visible light, and that transparency is not appreciably affected by a luminescent temperature probe (dot) of diameter not greater than a few μm$^2$. Thus, such absorber/probe combination lends itself to simultaneous infrared and visible imaging, as the most suitable photo-electronic imaging devices (for example CCD arrays) for processing the luminescent image into a visible display are also the most suitable visible light imaging devices. In practice the wavelengths of the luminescence emitted by the temperature probe are mostly longer than about 650 nm, and the wavelengths of the visible image are mostly shorter. The infrared image and the visible light image of the same scene are both focused on the micromesh absorber comprised of a number N of pixels, each pixel having at least one temperature sensing dot. The infrared image is converted by the luminescent temperature sensing dots into a luminescence intensity distribution which, after subtracting the background luminescence from each pixel (that is, the luminescence intensity in the absence of the infrared radiation), corresponds to the intensity distribution of the infrared image. The visible image from the same scene is at least partially transmitted through the micromesh. Since the visible image and the luminescence image have different wavelengths, they can be separated by optical filters and processed separately by one or more photo-electronic image devices.

Application to Imaging Detectors for Infrared Astronomy.

Infrared astronomy studies require the measurement of extremely small intensities of infrared and sub-millimeter radiation. From equation (7) above we know that the temperature signal $\Delta I_f$ is proportional to $(mC_vT)^{-1}$. It is well known that the value of $C_v$ at temperatures below 4K is several or many orders of magnitute lower than at liquid nitrogen temperatures (77K or below). Therefore, current instruments for said studies use semiconductor or transition-edge superconductive detectors cooled below 4K. Even at these temperatures it is necessary to reduce m as far as practical.

Now consider a two-dimensional array of square infrared absorbing pixels. Each pixel is made of a weblike mesh of silicon nitride, which absorbs infrared radiation and conducts the energy to a tiny dot of the photoluminescent material that sits at the center of the web. The area of each pixel is $d^2$, where d is comparable to the wavelength of the infrared radiation incident on the array. Now, the linear dimensions of the fluorescent probes attached to each of those pixels could be more than an order of magnitude smaller than d, because they need not be much greater than the wavelength of the fluorescence excitation light, typically shorter than 800 nanometers. If the fluorescent probe is chosen from the already mentioned phthalocyanines or naphthalocyanines and their chelates with zinc (Zn), magnesium (Mg) or aluminum (Al), their absorption coefficients are so high that the optical thickness of the probe need not be much greater than 1 micrometer. Therefore the fluorescent film should make only a relatively small contribution to the thermal mass of the detector, much smaller than that of the electrical bolometers currently being used.

Now, a long wavelength infrared image focused on said two-dimensional array of infrared absorbing pixels, each having a small, thin dot of the fluorescent probe attached to it and illuminated by the fluorescence excitation light, will be converted into an image of wavelength within the spectral range of operation of presently used low light level TV cameras, and the system cost should be much less than the cost of the imaging devices presently used in infrared astronomy.

Examples of Preferred Materials for Optical Thermometers for the Cryogenic Region.

Virtually all luminescent materials should behave according to equations 4-6 above, but the requirement of a low thermal mass narrows the choice of fluorescent materials to those that have very high absorption coefficients to the fluorescence excitation light. Fortunately the class of thin film solar cells provides suitable candidates. CdTe and CdZnTe have both high absorption coefficients and high luminescence quantum efficiencies. CdTe, for instance, has a peak absorption coefficient a of the order of $10^5$ cm$^{-1}$. Other promising candidates are fluorescent dyes with very high molar absorption coefficients, for example phthalocyanines or naphthalocyanines and their chelates with zinc (Zn), magnesium (Mg) or aluminum (Al). All these materials can be used for temperature probes based on the temperature dependence of their optical absorption coefficient.

2.3 Discrete and Imaging Detectors for Sub-Millimeter and Millimeter Radiation

The advantages of the microscopic photoluminescent temperature probes of this invention are most evident in the sensing of far infrared, sub-millimeter or millimeter radiation. The mass of the $Si_3N_4$ micromesh absorber is a much smaller fraction of the mass of a continuous absorber film, so the fill factor and, hence, the fraction of the mass of the absorber compared to that of a continuous solid film, can be less than 0.10, as the fiber-to-fiber distance can be greater than 20 μm. The mass of the photoluminescent temperature probe can be less than $10^{-3}$ of the mass of a continuous probe covering the area of a continuous absorber film. The linear dimensions of a discrete detector depend on the desired wavelength range of the radiation to be detected. A two-dimensional array of said detectors could be used an imaging detector.

Many sub-millimeter and millimeter radiation detectors are used in astronomy studies. Since the signals are usually very weak, the needed sensitivity requires the cooling of the detectors to sub-kelvin temperatures, at which the heat capacity of the detector is orders of magnitude smaller than at ordinary temperatures.

The dimensions of the radiation absorber have to be greater than the radiation wavelength. Therefore, and depending on said wavelength, the area of the absorber can be several mm².

When operated at sub-kelvin temperatures, the temperature probe must be a photoluminescent material the molecules of which have the same orientation in space and be identical, at least to the extent of having identical or nearly identical electronic and thermally excited energy levels, with energy differences no greater than a few cm$^{-1}$. This usually requires that the photoluminescent material be a single crystal.

3. Application to Quantum Calormeters for X-Ray and Other High Energy Particles

Quantum calorimeters are essentially devices for measuring the thermal energy deposited by pulses of radiation on an absorber/detector capable of generating a temperature-dependent signal. They are used extensively in astrophysics for measuring the energy deposited by X-rays and other high energy particles. It is usually required to measure the energy deposited by single particles in the KeV range, with a resolution of several eV. Because the energies being measured are usually very low, the temperature increase would be minimal and unmeasurable unless the particle absorber in the calorimeter is cooled to sub-kelvin temperatures. In this case the heat capacity $C_v$ of the absorber is so small that even a single X-ray photon or particle of similar energy can generate a temperature rise in it of a few milliKelvins.

A quantum calorimeter consists of a material that absorbs efficiently the energy of the incident particle, and a temperature probe attached thereto. In state-of-the-art calorimeters the temperature sensor is either a suitably doped semiconductor thermistor or a superconducting transition edge sensor (TES). A TES is much more sensitive than a thermistor for a given heat capacity of the absorber/sensor system but, because it is sensitive only in the limited temperature range of the superconducting transition, its heat capacity has to be sufficiently large to keep the temperature within the range of the transition. Both the thermistor calorimeters and the TES calorimeters are subject to Johnson noise and Joule heating limitations, and their energy resolutions are similar.

The following was copied from the web page of NASA's Goddard Space Flight Center:

Superconducting transition-edge sensors (TES) can achieve values of a more than an order of magnitude higher than semiconductor thermistors. Because they are only sensitive in the limited temperature range of the superconducting transition, however, the heat capacity must be large enough to keep the temperature within the transition upon the absorption of the highest energy X-ray of interest in a particular experiment. Thus, for the astronomical X-ray band, the theoretical resolution for TES-based and semiconductor-based microcalorimeters is about the same. The advantage of TES-based devices is that the larger heat capacity budget permits a wider choice of absorber materials. Normal metals, offlimits to semiconductor-based calorimeters, can be used with TES-based calorimeters, exploiting the rapid and efficient thermalization that occurs in metals. This permits the design of a fast device. Electrothermal feedback, present in any resistive calorimeter because the bias power into the device changes as its resistance changes, can be particularly dramatic in a high-a device. Voltage-biasing of a TES produces extreme negative feedback, permitting stable biasing within the narrow superconducting transition and actually making the recovery time of the thermal pulses faster than the intrinsic thermal time constant. Energy resolution of 4.7 eV at 6 keV has already been demonstrated with a single pixel TES device and 2.38 eV at 1.5 keV with count rates in excess of 400 counts s$^{-1}$ on another device. Low-noise read-out of low-resistance transition-edge thermometers is achieved through series arrays of superconducting quantum interference devices (SQUIDs).

The Space Research Organization of Netherlands (SRON) uses copper foils of dimensions 250 μm×250 μm×0.8 μm, attached to a TES temperature probe.

The ASTRO-E XRS X-ray calorimeter jointly developed by NASA/Goddard and the University of Wisconsin uses high atomic number absorbers like HgTe several micrometerss thick and having an area of about 0.25 mm², a volume of the order of $5 \times 10^{-4}$ mm³. This is in thermal contact with a thermistor that inevitably increases appreciably the thermal mass of the system, in addition to generating Johnson noise and Joule heating.

Now, the principles discussed above permit one to attach to be absorber (for example the HgTe absorber in the ASTRO-E XRS calorimeter), instead of an electrical thermometer, a microscopic optical temperature probe made, for example, of CdTe with dimensions, say, 0.010 mm×0.002 mm×0.002 mm, a volume of $4 \times 10^{-8}$ mm$^3$, four orders of magnitude smaller and, hence, negligible contribution to the calorimeter thermal mass. An alternate temperature probe is a microscopic thin film of a metal chelate of a phthalocyanine or a naphthalocyanine.

In a preferred embodiment the calorimeter is kept at a suitably cold temperature $T_o$, for example 0.06 kelvins. The X-ray absorber itself, for example HgTe, does not have a high fluorescence quantum efficiency. When an X-ray quantum enters the absorber and is thermalized therein, the temperature increase produces a pulsed increase in the fluorescence intensity of the fluorescent temperature probe attached to the absorber as a function of the energy of the absorbed X-ray quantum.

Since changes may be made in the foregoing disclosure without departing from the scope of the invention herein involved, it is intended that all matter contained in the above description and depicted in the accompanying drawings be construed in an illustrative and not in a limiting case.

The invention claimed is:

1. An essentially planar detector of non-visible electromagnetic radiation, said detector including an essentially planar absorber of said radiation having dimensions, area and thermal mass not substantially greater than minimally needed for the capture of a desired fraction of the intensity of said radiation incident on the detector, and at least one temperature probe attached to or incorporated into said absorber and comprised of a photoluminescent material so characterized that, when exposed to said radiation and illuminated with luminescence excitation light of suitable wavelength or wavelengths and pre-selected intensity, it absorbs at least a fraction of the intensity of said excitation light, thereby generating a luminescence light separable from the illuminating light, at least part of the intensity of which is emitted from the probe at visible or near infrared wavelengths including $\lambda_f$ different from those of said excitation light, the intensity and/or spectral distribution of said luminescence light being indicative of the probe temperature, the detector being characterized by undergoing a temperature rise upon the absorption of said radiation and further so characterized that its thermal mass at its operating temperature is not significantly greater than 1.1 times the mass of said absorber alone.

2. A detector of electromagnetic radiation as claimed in claim 1, wherein said photoluminescent material is so characterized that, when illuminated with light of suitable visible or near infrared wavelengths $\lambda_v$ and an intensity $P_o$, it absorbs a fraction $\alpha_T P_o$ of the intensity of said illuminating light, thereby generating a luminescence light separable from the illuminating light, at least part of the intensity of which is emitted from the probe at visible or near infrared wavelengths including $\lambda_f$ different from $\lambda_v$, where $\alpha T$ is a temperature-dependent fraction smaller than unity, the value of which varying in a known manner with varying temperature within the temperature range of operation of the probe, the intensity of said luminescence light being substantially proportional to the value of $\alpha_T$.

3. A detector as claimed in claim 2 and having said temperature probe incorporated within said absorber.

4. A two-dimensional array of detectors, each of said detectors as claimed in claim 2, and adapted to convert an image of radiation of medium infrared or longer wavelengths emitted and/or reflected from one or more objects and focused on the array into a corresponding image of visible or near infrared wavelengths, said array having dimensions and an area suitable for the capture of said image.

5. An arrangement for converting an image of radiation of medium infrared or longer wavelengths emitted and/or reflected from one or more objects into a displayed visible image, including:
  a) a two-dimensional array of detectors as claimed in claim 4;
  b) optical means for focusing said image of radiation of medium infrared or longer wavelengths on said two-dimensional array of detectors;
  c) a source of luminescence excitation light of suitable wavelength or wavelengths and pre-selected intensity for illuminating said temperature probes, thereby generating said luminescence light image of visible or near infrared wavelengths $\lambda_f$; and
  d) a photo-electronic image device for processing said luminescence light image into a visible display indicative of said image of radiation of medium infrared or longer wavelengths.

6. A detector as claimed in claim 1 and adapted to the detection of infrared radiation and sub-millimeter radiation, wherein said temperature probe is coated on a small fraction only of the area of said absorber, said fraction not significantly greater than one tenth of the area of said absorber.

7. A detector as claimed in claim 6 wherein said planar absorber has a thickness not greater than about 10 micrometers and is comprised of a metalized micromesh of fibers of a pre-selected material such that the mass of the absorber is much smaller than the mass of a continuous solid film of the same material and thickness.

8. A detector as claimed in claim 6 wherein the area of said temperature probe is not much greater than about 4 square micrometers.

9. A detector as claimed in claim 6 and adapted to the detection of infrared radiation of wavelengths from 3 to 20 micrometers, wherein the mass of said photoluminescent temperature probe is not greater than $10^{-10}$ grams.

10. A detector as claimed in claim 9 wherein said probe is comprised of material so characterized that, when illuminated with light of suitable visible or near infrared wavelengths $\lambda_v$ and an intensity $P_o$, it absorbs a fraction $\alpha_T P_o$ of the intensity of said illuminating light, thereby generating a luminescence light separable from the illuminating light, at least part of the intensity of which is emitted from the probe at visible or near infrared wavelengths including $\lambda_f$ different from $\lambda_v$, where $\alpha_T$ is a temperature-dependent fraction smaller than unity, the value of which varying in a known manner with varying temperature within the temperature range of operation of the probe, the intensity of said luminescence light being substantially proportional to the value of $\alpha_T$.

11. A two-dimensional array of detectors, each of said detectors as claimed in claim 9, and adapted to convert an image of radiation of wavelengths from 3 to 20 micrometers emitted and/or reflected from one or more objects and focused on the array into a corresponding image of visible or near infrared wavelengths, said array having dimensions and an area suitable for the capture of said image.

12. A detector as claimed in claim 6 and adapted to the detection of infrared radiation of wavelengths from 3 to 20 micrometers, wherein the mass of said photoluminescent temperature probe is not greater than $10^{-11}$ grams.

13. A detector as claimed in claim 1 wherein said photoluminescent material is so characterized that, when illuminated with light of suitable wavelengths, it emits luminescence light having a spectral distribution indicative of the temperature of the material.

14. A detector as claimed in claim 13 wherein said photoluminescent material is so characterized that, when illuminated with light of suitable wavelengths, it emits luminescence lights from two distinct kinds of luminescence centers herein referred to as A centers and B centers, the A centers emitting light of visible wavelengths $\lambda_1$ and the B centers emitting light of visible wavelengths $\lambda_2$ different from $\lambda_1$, the relative intensities of the luminescence lights from the A centers and the B centers being indicative of the probe temperature.

15. A detector as claimed in claim 14 wherein said photoluminescent material is chosen from the groups of materials including luminescent semiconductors and crystalline chelates, wherein at least one the luminescent centers A or B is a rare earth ion.

16. A detector as claimed in claim 1 and adapted to the detection of X-rays and other high energy electromagnetic radiation, wherein said absorber is comprised of a material chosen from the group of materials including heavy metals and their compounds.

17. A detector as claimed in claim 1 and adapted to convert an image of radiation of medium infrared or longer wavelengths emitted and/or reflected from one or more objects and focused on the detector into a corresponding luminescence light image of visible or near infrared wavelengths, said detector including an essentially planar absorber of said radiation having dimensions, area and thermal mass not substantially greater than minimally needed for the capture of said image, the total area A of the absorber including a number N of pixels, each pixel having an area of about A/N and having attached to or incorporated in it at least one photoluminescent temperature probe.

18. A detector as claimed in claim 17 wherein said absorber is comprised of a metalized micromesh of fibers of a pre-selected material such that the mass of the absorber is much smaller than the mass of a continuous solid film of the same material and thickness.

19. A detector as claimed in claim 17 wherein said temperature probes are comprised of a photoluminescent material so characterized that, when illuminated with light of suitable visible or near infrared wavelengths $\lambda_v$ and an intensity $P_o$, it absorbs a fraction $\alpha_T P_o$ of the intensity of said illuminating light, thereby generating a luminescence light separable from the illuminating light, at least part of the intensity of which is emitted from the probe at visible or near infrared wavelengths including $\lambda_f$ different from $\lambda_v$, where $\alpha_T$ is a temperature-dependent fraction smaller than unity, the value of which varying in a known manner with varying temperature within the temperature range of operation of the probe, the intensity of said luminescence light being substantially proportional to the value of $\alpha_T$.

20. An arrangement for converting an image of radiation of medium infrared or longer wavelengths emitted and/or reflected from one or more objects into a displayed visible image, including:
 a) a detector as claimed in claim 19;
 b) optical means for focusing said image of radiation of medium infrared or longer wavelengths on said detector;
 c) a source of luminescence excitation light of suitable wavelength or wavelengths and pre-selected intensity for illuminating said temperature probes, thereby generating said luminescence light image of visible or near infrared wavelengths $\lambda_f$; and
 d) a photo-electronic image device for processing said luminescence light image into a visible display indicative of said image of radiation of medium infrared or longer wavelengths.

21. A detector as claimed in claim 17 wherein said temperature probes are comprised of a photoluminescent material so characterized that, when illuminated with light of suitable visible or near infrared wavelengths, it emits luminescence light having a spectral distribution indicative of the temperature of the material.

22. A detector as claimed in claim 21 wherein said temperature probes are comprised of a photoluminescent material is so characterized that, when illuminated with light of suitable wavelengths, it emits luminescence lights from two distinct kinds of luminescence centers herein referred to as A centers and B centers, the A centers emitting light of visible wavelengths $\lambda_1$ and the B centers emitting light of visible wavelengths $\lambda_2$ different from $\lambda_1$, the relative intensities of the luminescence lights from the A centers and the B centers being indicative of the probe temperature.

23. An arrangement for converting an image of radiation of medium infrared or longer wavelengths emitted and/or reflected from one or more objects into a displayed visible image, including:
 a) a detector as claimed in claim 22;
 b) optical means for focusing said image of radiation of medium infrared or longer wavelengths on said detector;
 c) a source of luminescence excitation light of suitable wavelength or wavelengths and pre-selected intensity for illuminating said temperature probes, thereby generating said luminescence light image of visible or near infrared wavelengths $\lambda_f$; and
 d) a photo-electronic image device for processing said luminescence light image into a visible display indicative of said image of radiation of medium infrared or longer wavelengths.

24. An arrangement for converting an image of radiation of medium infrared or longer wavelengths emitted and/or reflected from one or more objects into a displayed visible image, including:
 a) a detector as claimed in claim 21;
 b) optical means for focusing said image of radiation of medium infrared or longer wavelengths on said detector;
 c) a source of luminescence excitation light of suitable wavelength or wavelengths and pre-selected intensity for illuminating said temperature probes, thereby generating said luminescence light image of visible or near infrared wavelengths $\lambda_f$; and
 d) a photo-electronic image device for processing said luminescence light image into a visible display indicative of said image of radiation of medium infrared or longer wavelengths.

25. An arrangement for converting an image of radiation of medium infrared or longer wavelengths emitted and/or reflected from one or more objects into a displayed visible image, including:
 a) a detector as claimed in claim 17;
 b) optical means for focusing said image of radiation of medium infrared or longer wavelengths on said detector;
 c) a source of luminescence excitation light of suitable wavelength or wavelengths and pre-selected intensity for illuminating said temperature probes, thereby generating said luminescence light image of visible or near infrared wavelengths $\lambda_f$; and d) a photo-electronic image device for processing said luminescence light image into a visible display indicative of said image of radiation of medium infrared or longer wavelengths.

26. A two-dimensional array of detectors, each of said detectors as claimed in claim 1, and adapted to convert an image of radiation of medium infrared or longer wavelengths emitted and/or reflected from one or more objects and focused on the array into a corresponding image of visible or near infrared wavelengths, said array having dimensions and an area suitable for the capture of said image.

27. A two-dimensional array of detectors, each of said detectors as claimed in claim 26, wherein said temperature probes are comprised of a photoluminescent material so characterized that, when illuminated with light of suitable visible or near infrared wavelengths, it emits luminescence light having a spectral distribution indicative of the temperature of the material.

28. A two-dimensional array of detectors as claimed in claim 27 wherein said photoluminescent material is further so characterized that, when illuminated with light of suitable visible or near infrared wavelengths, it emits luminescence lights from two distinct kinds of luminescence centers herein referred to as A centers and B centers, the A centers emitting light of visible wavelengths $\lambda_1$ and the B centers emitting light of visible wavelengths $\lambda_2$ different from $\lambda_1$, the relative intensities of the luminescence lights from the A centers and the B centers being indicative of the probe temperature.

29. An arrangement for converting an image of radiation of medium infrared or longer wavelengths emitted and/or reflected from one or more objects into a displayed visible image, including:
   a) a two-dimensional array of detectors as claimed in claim 28;
   b) optical means for focusing said image of radiation of medium infrared or longer wavelengths on said two-dimensional array of detectors;
   c) a source bf luminescence excitation light of suitable wavelength or wavelengths and pre-selected intensity for illuminating said temperature probes, thereby generating said luminescence light image of visible or near infrared wavelengths $\lambda_f$; and
   d) a photo-electronic image device for processing said luminescence light image into a visible display indicative of said image of radiation of medium infrared or longer wavelengths.

30. An arrangement for converting an image of radiation of medium infrared or longer wavelengths emitted and/or reflected from one or more objects into a displayed visible image, including:
   a) a two-dimensional array of detectors as claimed in claim 27;
   b) optical means for focusing said image of radiation of medium infrared or longer wavelengths on said two-dimensional array of detectors;
   c) a source of luminescence excitation light of suitable wavelength or wavelengths and pre-selected intensity for illuminating said temperature probes, thereby generating said luminescence light image of visible or near infrared wavelengths $\lambda_f$; and
   d) a photo-electronic image device for processing said luminescence light image into a visible display indicative of said image of radiation of medium infrared or longer wavelengths.

31. An arrangement for converting an image of radiation of medium infrared or longer wavelengths emitted and/or reflected from one or more objects into a displayed visible image, including:
   a) a two-dimensional array of detectors as claimed in claim 26;
   b) optical means for focusing said image of radiation of medium infrared or longer wavelengths on said two-dimensional array of detectors;
   c) a source of luminescence excitation light of suitable wavelength or wavelengths and pre-selected intensity for illuminating said temperature probes, thereby generating said luminescence light image of visible or near infrared wavelengths $\lambda_f$; and
   d) a photo-electronic image device for processing said luminescence light image into a visible display indicative of said image of radiation of medium infrared or longer wavelengths.

32. An arrangement for sensing electromagnetic radiation, including
   a) a detector as claimed in claim 1;
   b) a source of luminescence excitation light of suitable wavelength or wavelengths and pre-selected intensity for illuminating said temperature probe, thereby generating said luminescence light of wavelengths including $\lambda_f$ and an intensity or spectral distribution indicative of the probe temperature;
   c) optical means for directing a fraction of the intensity of the luminescence light of wavelengths including $\lambda_1$ to photodetector means; and
   d) photodetector and associated means for sensing changes of the intensity or spectral distribution of said luminescence light of wavelengths including $\lambda_f$, emitted by said probe, said change being an indicator of the increase of the probe temperature and, hence, of the energy of said radiation absorbed by said absorber.

33. An arrangement as claimed in claim 32 and adapted to sense infrared and sub-millimeter radiation, wherein said photoluminescent material is so characterized that, when illuminated with light of suitable visible or near infrared wavelengths $\lambda_v$ and an intensity $P_o$, it absorbs a fraction $\alpha_T P_o$ of the intensity of said illuminating light, thereby generating a luminescence light separable from the illuminating light, at least part of the intensity of which is emitted from the probe at visible or near infrared wavelengths including $\lambda_f$ different from $\lambda_v$, where $\alpha_T$ is a temperature-dependent fraction smaller than unity, the value of which varying in a known manner with varying temperature within the temperature range of operation of the probe, the intensity of said luminescence light being substantially proportional to the value of $\alpha_T$.

34. An arrangement as claimed in claim 32 adapted to the detection of infrared radiation of wavelengths from 3 to 20 micrometers, wherein the mass of said photoluminescent temperature probe is not greater than $10^{-10}$ grams.

* * * * *